US010524423B1

(12) United States Patent
Olson et al.

(10) Patent No.: US 10,524,423 B1
(45) Date of Patent: Jan. 7, 2020

(54) PLANT PROCESSING SYSTEM

(71) Applicant: PEARSON INCORPORATED, Sioux Falls, SD (US)

(72) Inventors: Roy Olson, Sioux Falls, SD (US); Joshua Tracy, Harrisburg, SD (US); Alex Pearson, Sioux Falls, SD (US)

(73) Assignee: Hemp Processing Solutions, LLC, Harrisburg, SD (US)

( * ) Notice: Subject to any disclaimer, the term of this patent is extended or adjusted under 35 U.S.C. 154(b) by 0 days.

(21) Appl. No.: 16/279,445

(22) Filed: Feb. 19, 2019

(51) Int. Cl.
*A01D 45/06* (2006.01)
*A01D 46/02* (2006.01)
*A23N 15/00* (2006.01)

(52) U.S. Cl.
CPC ........... *A01D 45/065* (2013.01); *A01D 46/02* (2013.01); *A23N 15/00* (2013.01)

(58) Field of Classification Search
CPC ........ A01D 33/02; A01D 33/08; A01D 46/02; A01D 45/065; A01B 17/026; A23N 15/00
USPC .................. 460/126, 129, 134, 144
See application file for complete search history.

(56) References Cited

U.S. PATENT DOCUMENTS

| 288,743 | A | * | 11/1883 | Swingle ............... A01D 45/006 460/144 |
| 1,678,134 | A | | 7/1928 | Cromer |
| 2,608,973 | A | * | 9/1952 | Coons .................... A01D 45/24 460/114 |
| 5,044,115 | A | | 9/1991 | Richardson |
| 5,419,107 | A | | 5/1995 | Shelbourne |
| 5,632,135 | A | | 5/1997 | Baker, IV |
| 5,846,129 | A | * | 12/1998 | Dragt .................. A01D 45/006 460/144 |
| 6,016,626 | A | | 1/2000 | Auer |
| 9,510,507 | B1 | | 12/2016 | Abbott |
| 9,723,786 | B2 | | 8/2017 | Brummelhuis |
| 2007/0209347 | A1 | | 9/2007 | Malmros |
| 2011/0113740 | A1 | | 5/2011 | Desmarais |
| 2015/0027096 | A1 | | 1/2015 | Black |
| 2015/0156967 | A1 | * | 6/2015 | Steenland ............. A01D 46/02 460/129 |
| 2016/0039105 | A1 | | 2/2016 | Raichart |
| 2016/0100524 | A1 | | 4/2016 | Young |
| 2016/0120123 | A1 | | 5/2016 | Brummelhuis |
| 2016/0374386 | A1 | | 12/2016 | Desmarais |
| 2018/0035610 | A1 | | 2/2018 | Wieker |
| 2018/0126578 | A1 | | 5/2018 | Raichart |

(Continued)

FOREIGN PATENT DOCUMENTS

CA 2665876 11/2010
CN 101401506 6/2012

(Continued)

*Primary Examiner* — Alicia Torres
(74) *Attorney, Agent, or Firm* — Jeffrey A. Proehl; Woods, Fuller, Shultz & Smith, PC

(57) ABSTRACT

A plant processing system may include a plant stripping apparatus with a frame and a plurality of stripping fingers including at least two groups of the stripping fingers being movable relative to each other. Each group of fingers may extend from a respective working surface, and the working surfaces may be oriented in substantial opposition to each other with a gap being formed between the first and second working surfaces to provide a pathway for movement of plant materials between an input and an output of the stripping apparatus.

26 Claims, 11 Drawing Sheets

(56) References Cited

U.S. PATENT DOCUMENTS

2018/0213722 A1    8/2018   Pratt
2019/0124840 A1    5/2019   Bates

FOREIGN PATENT DOCUMENTS

| | | | |
|---|---|---|---|
| CN | 202873360 | | 4/2013 |
| CN | 103430692 | | 12/2013 |
| CN | 204907202 | | 12/2015 |
| CN | 205030140 | | 2/2016 |
| CN | 105594370 | | 5/2016 |
| CN | 108064545 | | 5/2018 |
| CN | 108076804 | | 5/2018 |
| CN | 108076814 | | 5/2018 |
| CN | 108633454 | | 10/2018 |
| CN | 108718676 | | 11/2018 |
| CN | 108811715 | | 11/2018 |
| DE | 2737115 | | 3/1979 |
| DE | 2807634 A1 * | 8/1979 | ............ A01D 45/22 |
| DE | 19627137 | | 1/1998 |
| EP | 0383410 | | 8/1990 |
| EP | 1757181 | | 2/2007 |
| EP | 2556740 | | 2/2013 |
| FR | 2885009 | | 11/2006 |
| GB | 736092 A * | 8/1955 | ............ A01D 46/02 |
| GB | 973177 A * | 10/1964 | ............ A01D 46/00 |
| RU | 2119737 C1 * | 10/1998 | |
| WO | 9419970 | | 9/1994 |
| WO | 2007133098 | | 11/2007 |
| WO | 2009128711 | | 10/2009 |
| WO | 2010130035 | | 11/2010 |
| WO | 2013160576 | | 10/2013 |
| WO | 2018014135 | | 1/2018 |
| WO | 2019157783 | | 8/2019 |

\* cited by examiner

US 10,524,423 B1

PLANT PROCESSING SYSTEM

BACKGROUND

Field

The present disclosure relates to plant processing machinery and more particularly pertains to a new plant processing system for separating constituent parts of plant material from each other.

Description of the Prior Art

The harvesting and processing of *cannabis* plant material for obtaining extracts of the plants, such as cannabidiol (CBD), on a large scale is a developing technology. For example, existing harvesting apparatus such as crop harvesters have been utilized to harvest the *cannabis* plant material (such as industrial hemp) and chop the plant material into a fairly uniform mixture of the plant parts. Of course, harvesting and processing by hand has been utilized for quite some time but is labor-intensive and inefficient for large-scale processing and production of the various extracts obtainable from the *cannabis* plant material, such as the oil of the *cannabis* plant. Moreover, traditional hand harvesting typically utilizes grinding or milling of the dried plant material to produce a mixture of all or virtually all of the plant parts for further processing such as isolation of the desired extract of the plant.

SUMMARY

In one aspect, the present disclosure relates to a plant processing system for processing plant material having at least two types of constituent parts attached together. The system may comprise a plant stripping apparatus configured to detach the constituent parts of the plant material from each other, with the plant stripping apparatus having an input and an output and being elongated in a longitudinal direction with a lateral direction oriented substantially perpendicular to the longitudinal direction. The plant stripping apparatus may include a frame and a plurality of stripping fingers. The fingers may comprise at least two groups of the stripping fingers including a first said group of stripping fingers and a second said group of stripping fingers, and at least one group of said stripping fingers may be movable with respect to the frame along a path of movement. The first group of fingers may extend from a first working surface and the second group of fingers may extend from a second working surface, and the first working surface may be oriented in substantial opposition to the second working surface. A gap may be formed between the first and second working surfaces, and the gap may provide a pathway for movement of plant materials between the input and output of the stripping apparatus. The stripping apparatus may further comprise at least one belt on which at least one of said groups of stripping fingers is mounted. The at least one belt has a first surface, and a portion of the first surface may form the first working surface from which the first group of fingers extends.

In another aspect, the present disclosure relates to a plant processing system for processing plant material having at least two types of constituent parts attached together. The system may comprise a plant stripping apparatus configured to detach the constituent parts of the plant material from each other, with the plant stripping apparatus having an input and an output and being elongated in a longitudinal direction and having a lateral direction oriented substantially perpendicular to the longitudinal direction. The plant stripping apparatus may include a frame and a plurality of stripping fingers. The fingers may comprise at least two groups of the stripping fingers including a first said group of stripping fingers and a second said group of stripping fingers, and at least one group of said stripping fingers being movable with respect to the frame along a path of movement. The first group of fingers may extend from a first working surface and the second group of fingers may extend from a second working surface, and the first working surface may be oriented in substantial opposition to the second working surface. A gap may be formed between the first and second working surfaces, and the gap may provide a pathway for movement of plant materials between the input and output of the stripping apparatus. The fingers of the first group of fingers and the fingers of the second group of fingers may be positioned substantially adjacent to each other, and the fingers of the first group of fingers may extend along a first longitudinal line and the fingers of the second group of fingers may extend along a second longitudinal line. The first longitudinal line may be laterally offset with respect to the second longitudinal line such that fingers of the first group of fingers move by fingers of the second group of fingers substantially without contact between the fingers of the first and second groups. The fingers of the first group of fingers may extend upwardly and the fingers of the second group of fingers may extend downwardly. The stripping apparatus may comprise a pair of belts with a first belt and a second belt, and the first belt may have a first surface with a portion of the first surface forming the first working surface, and the second belt may have a second surface with a portion of the second surface forming the second working surface. The first group of stripping fingers may be mounted on the first belt and the second group of stripping fingers may be mounted on the second belt. The system may further include a plant part separating apparatus receiving plant material from the output of the plant stripping apparatus and being configured to separate first plant parts of the constituent parts of the plant material from second plant parts of the constituent parts of the plant material. The plant part separating apparatus may be configured to create a pair of streams of the constituent parts, with a first said stream including the first plant parts of the constituent parts of the plant material and a second said stream including the second plant parts of the constituent parts of the plant material.

There has thus been outlined, rather broadly, some of the more important elements of the disclosure in order that the detailed description thereof that follows may be better understood, and in order that the present contribution to the art may be better appreciated. There are additional elements of the disclosure that will be described hereinafter and which will form the subject matter of the claims appended hereto.

In this respect, before explaining at least one embodiment or implementation in greater detail, it is to be understood that the scope of the disclosure is not limited in its application to the details of construction and to the arrangements of the components set forth in the following description or illustrated in the drawings. The disclosure is capable of other embodiments and implementations and is thus capable of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present disclosure. It is important, therefore, that the claims be regarded as including such equivalent constructions insofar as they do not depart from the spirit and scope of the present disclosure.

The advantages of the various embodiments of the present disclosure, along with the various features of novelty that characterize the disclosure, are disclosed in the following descriptive matter and accompanying drawings.

BRIEF DESCRIPTION OF THE DRAWINGS

The disclosure will be better understood and when consideration is given to the drawings and the detailed description which follows. Such description makes reference to the annexed drawings wherein.

DETAILED DESCRIPTION

Figure 1:
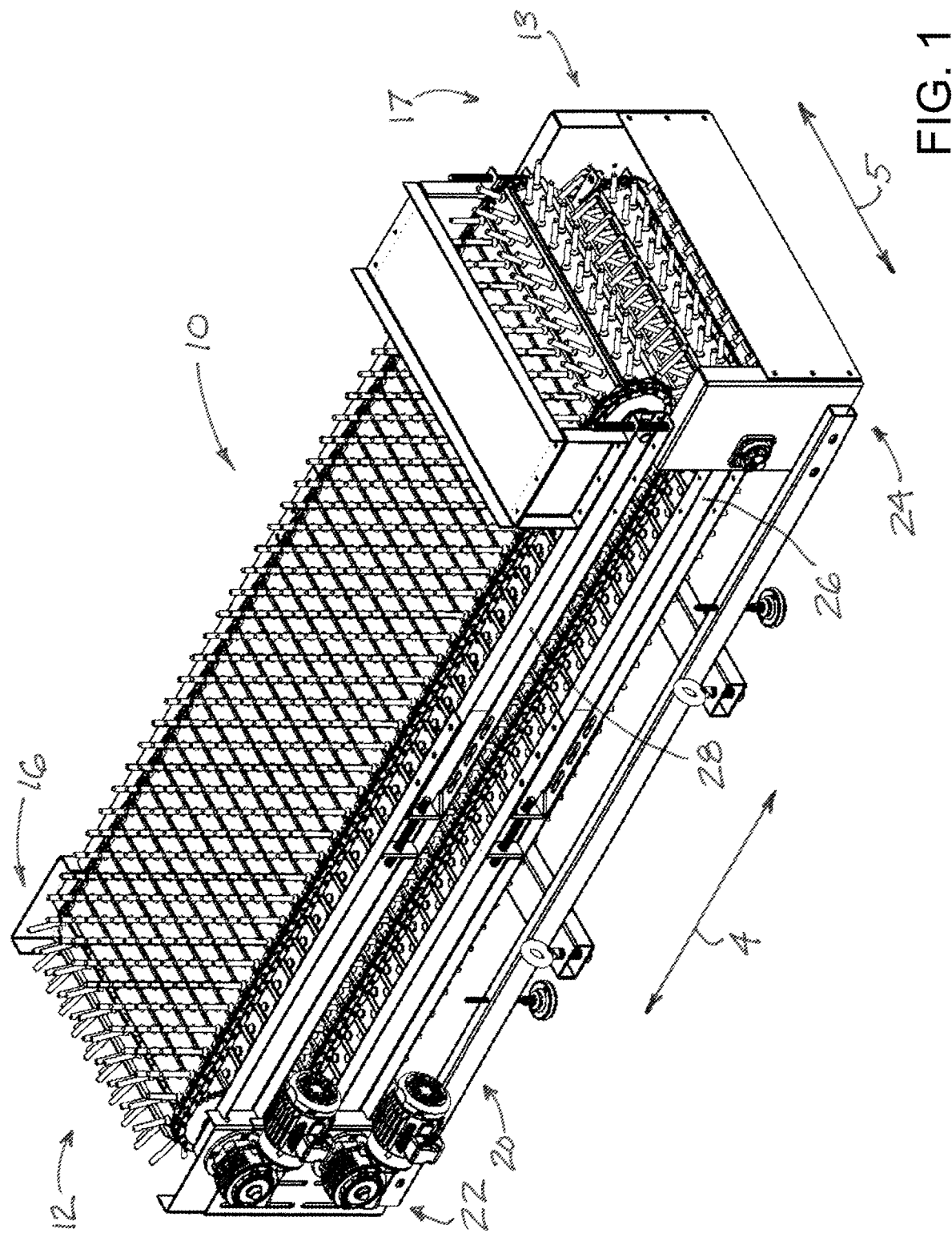
FIG. 1 is a schematic perspective view of the plant stripping apparatus of a new plant processing system with plant stripping capabilities, according to the present disclosure.
Figure 2:
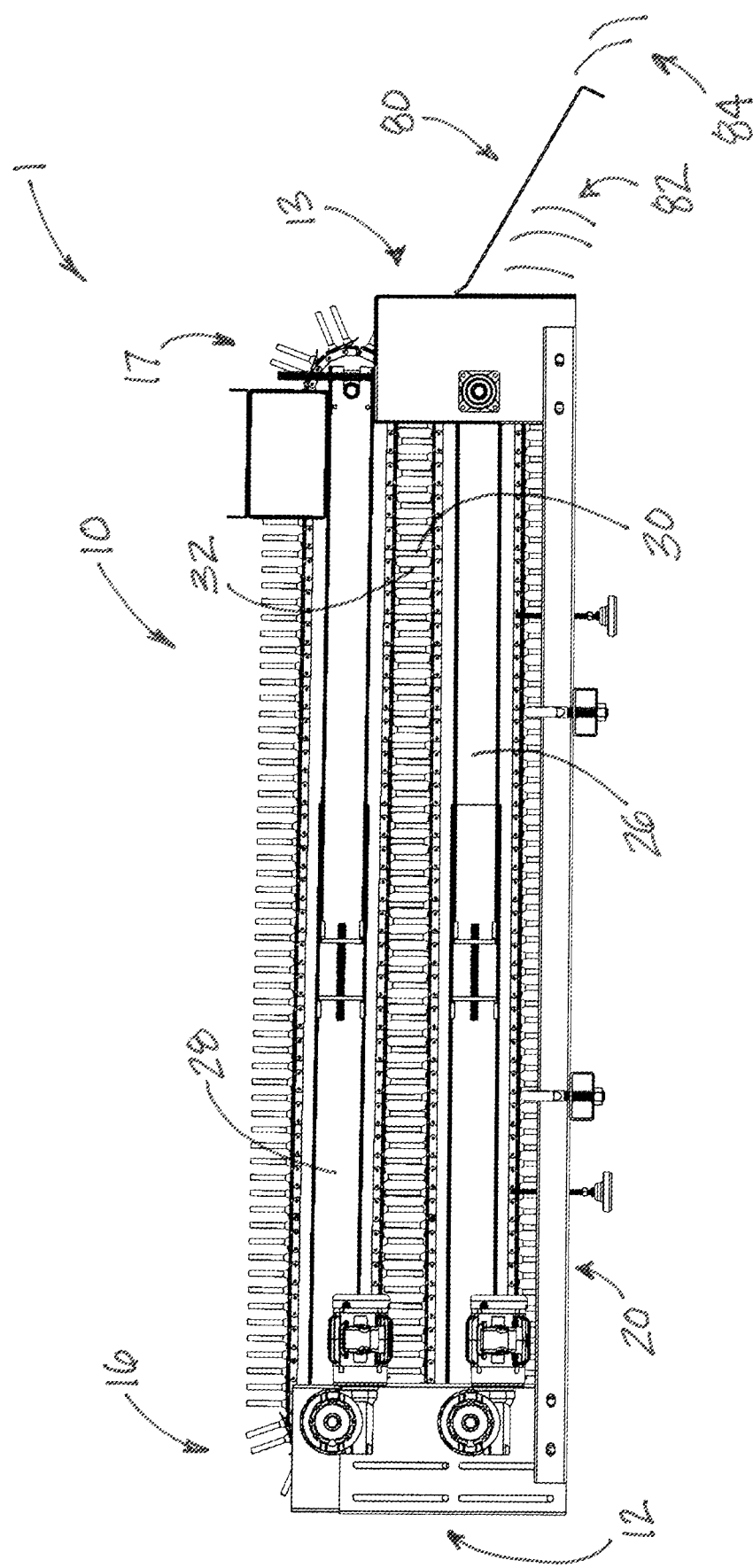
FIG. 2 is a schematic side view of the plant processing system, according to an illustrative embodiment.
Figure 3:
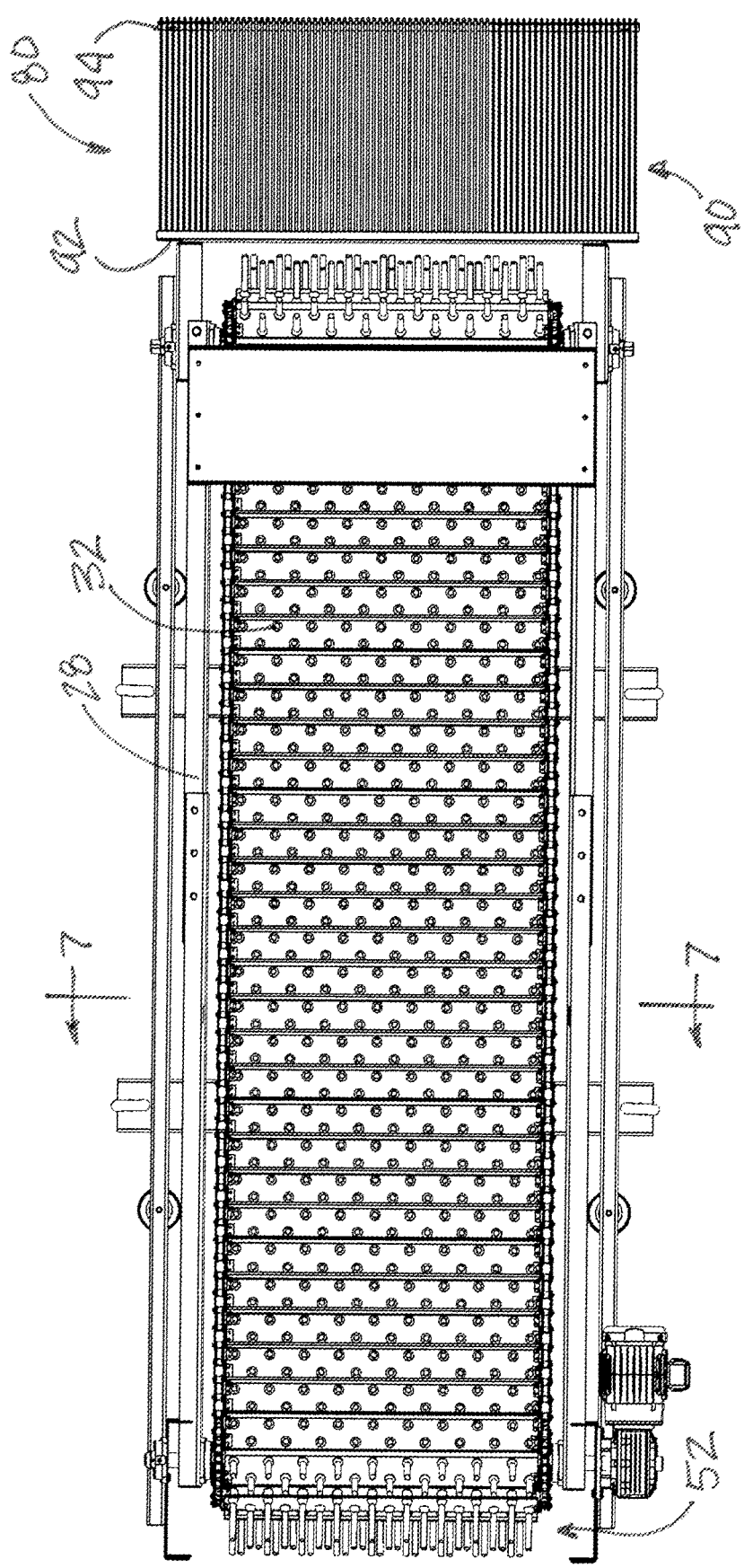
FIG. 3 is a schematic top view of the plant processing system, according to an illustrative embodiment.
Figure 4:
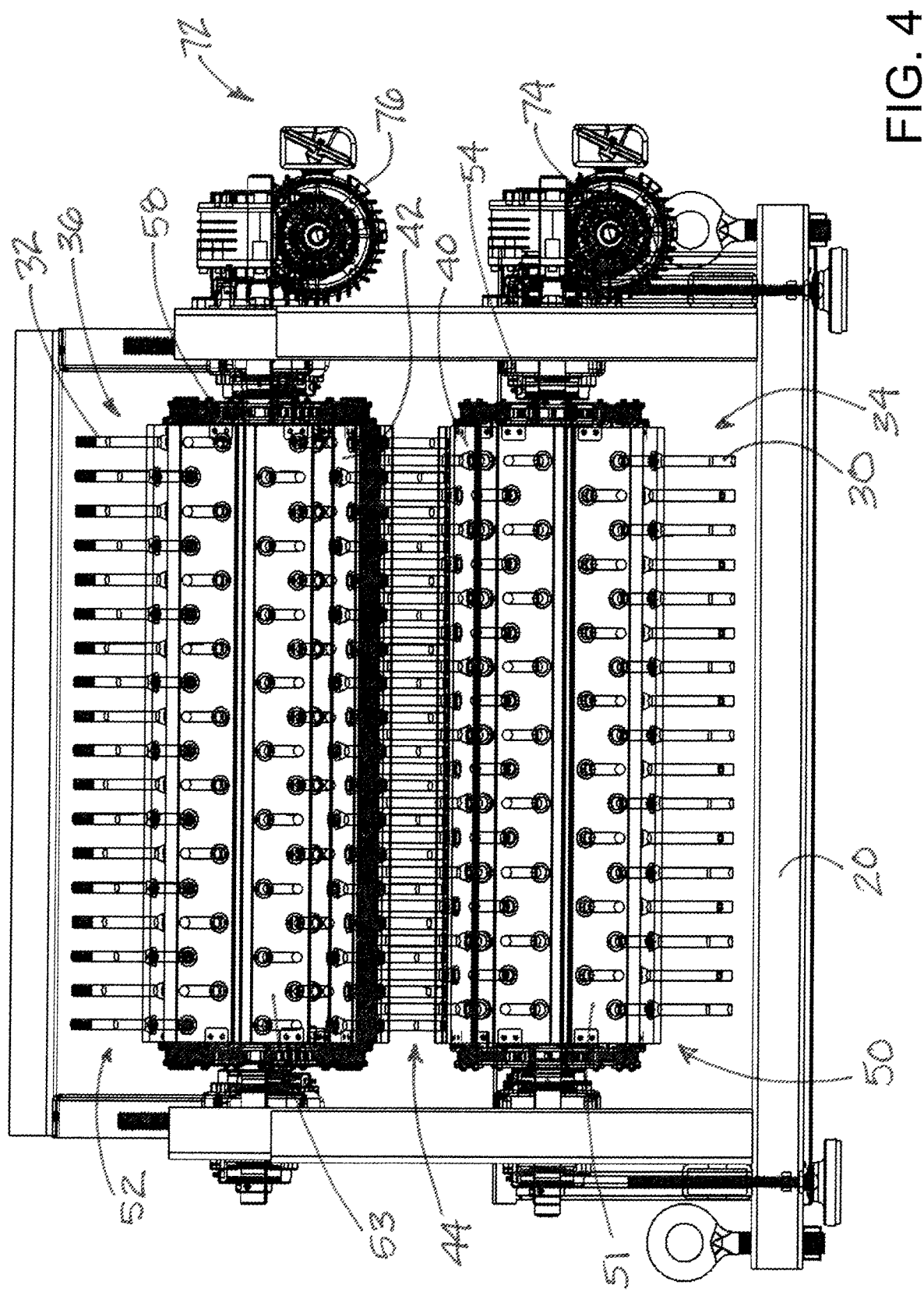
FIG. 4 is a schematic input end view of the plant processing system, according to an illustrative embodiment.
Figure 5:
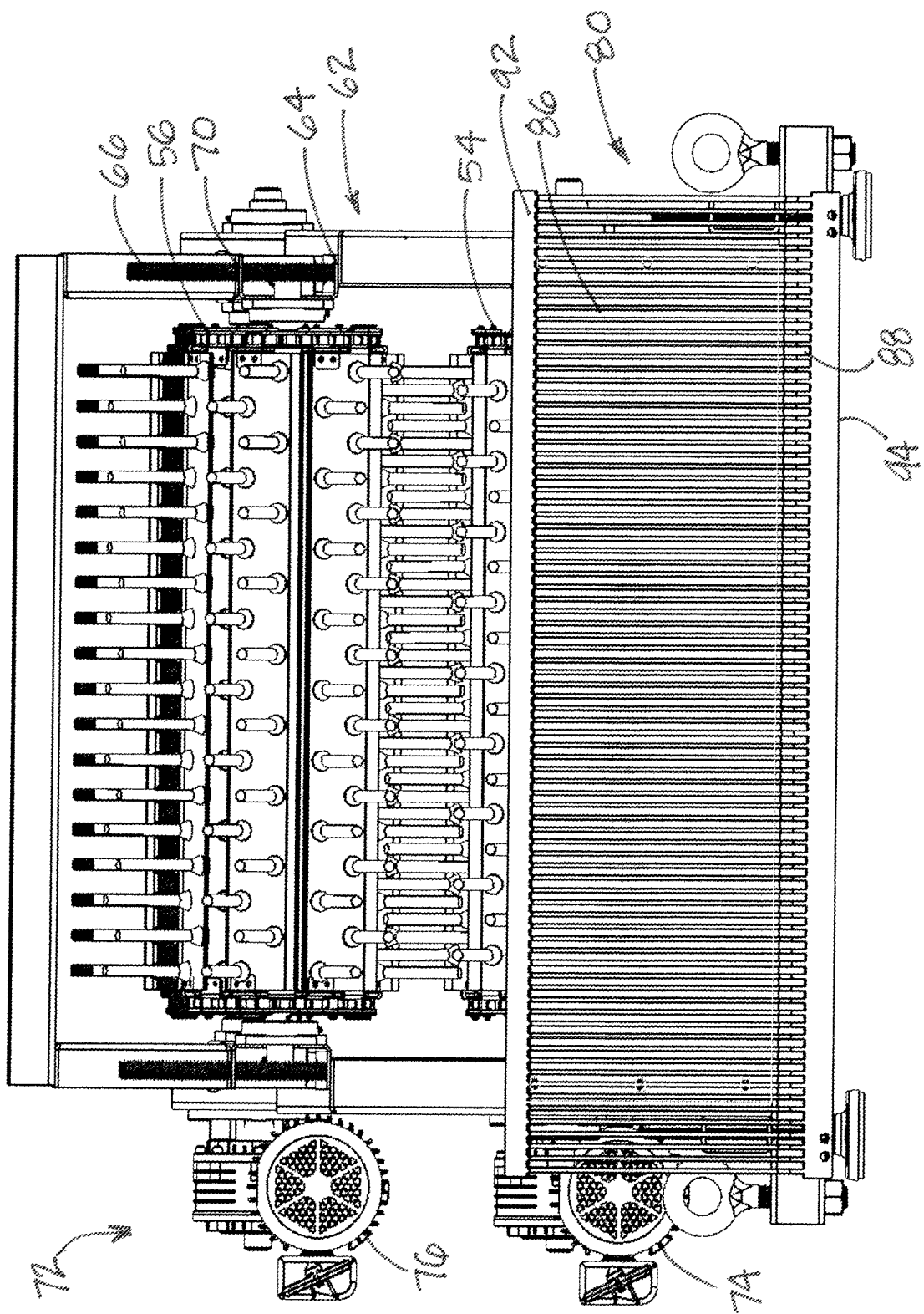
FIG. 5 is a schematic output end view of the plant processing system, according to an illustrative embodiment.
Figure 6:
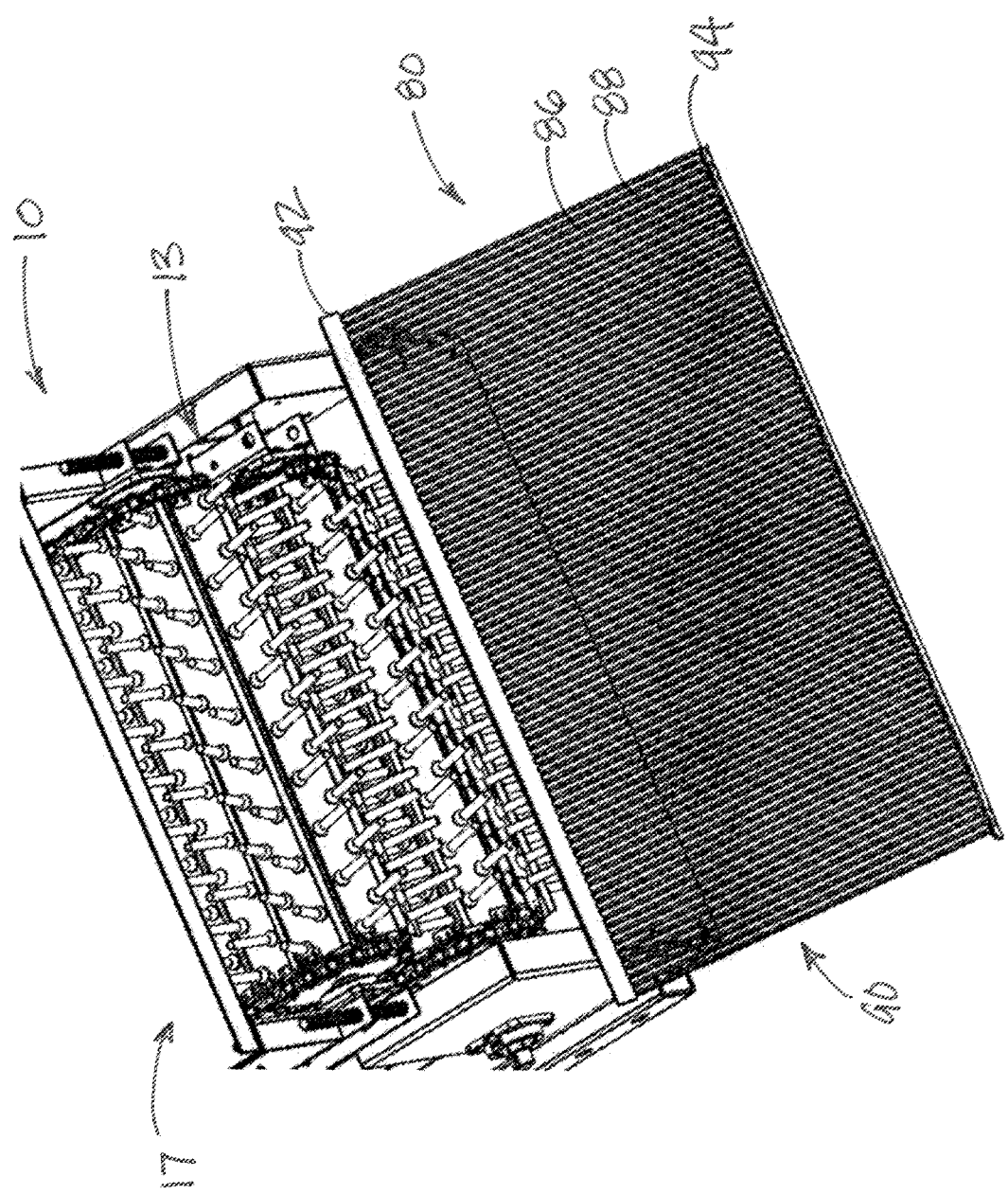
FIG. 6 is a schematic perspective view of a portion of the plant processing system, according to an illustrative embodiment.
Figure 7:
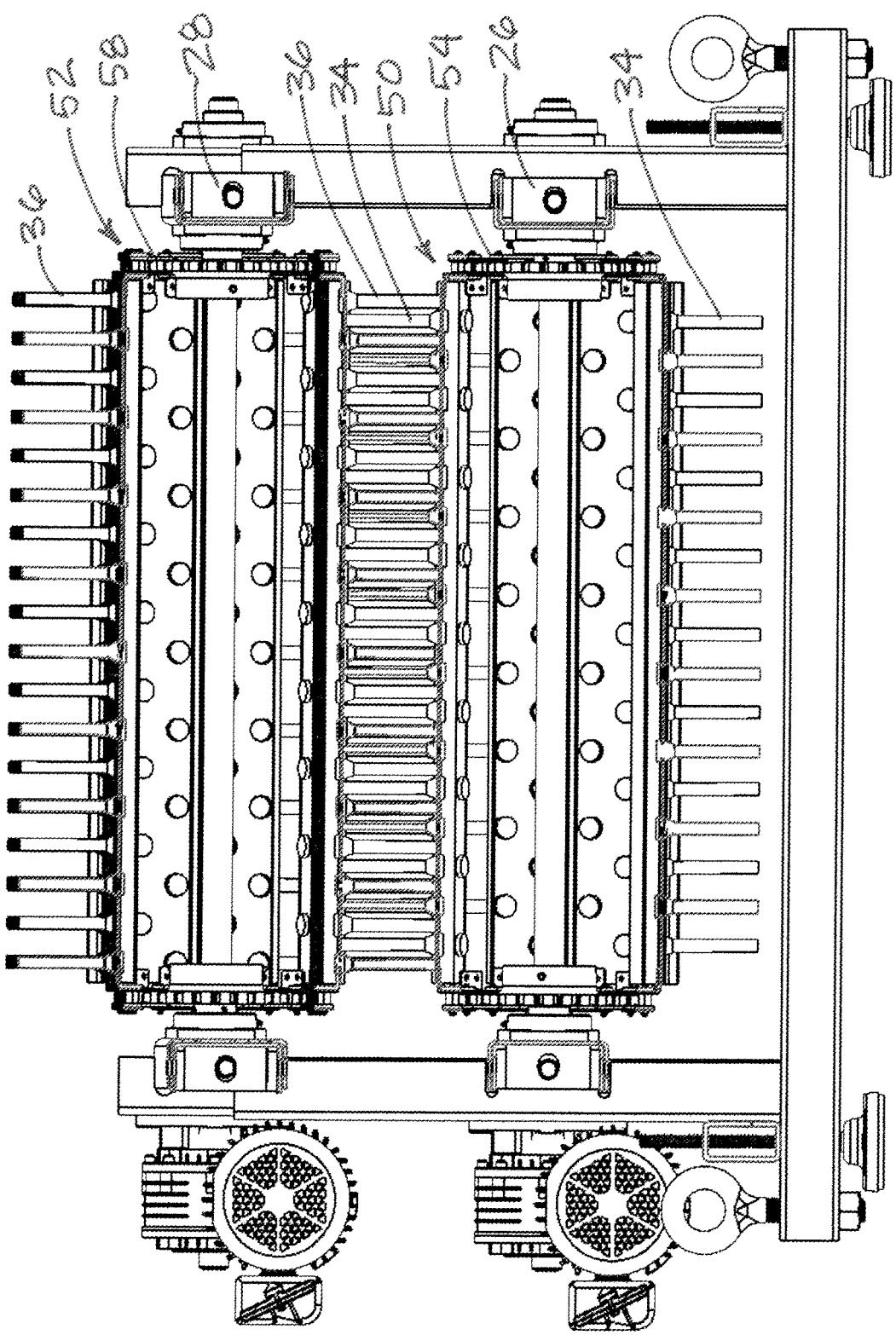
FIG. 7 is a schematic sectional view of the plant processing system taken along line 7-7 of FIG. 3, according to an illustrative embodiment.
Figure 8:
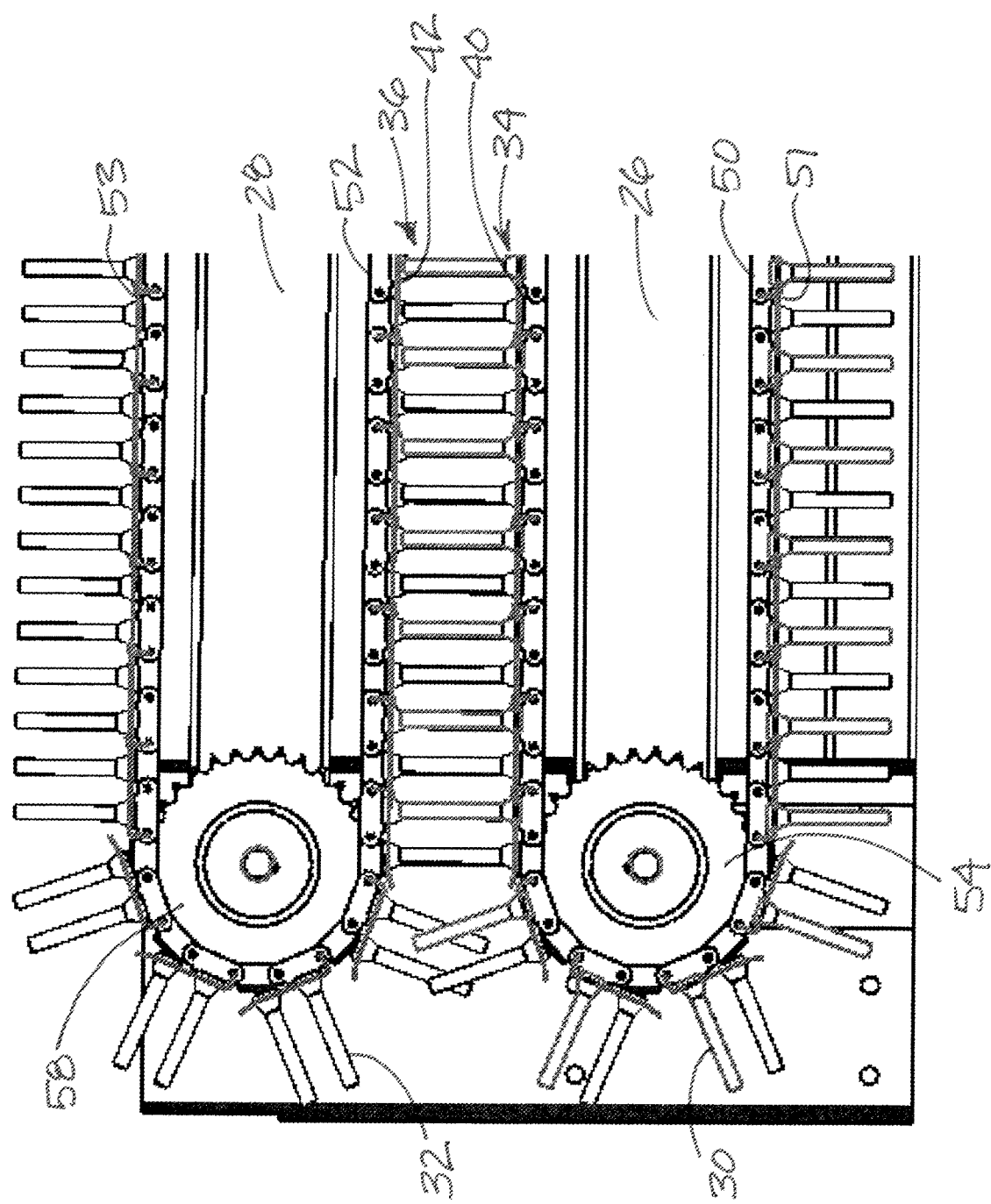
FIG. 8 is a schematic side view of an input end portion of the plant processing system, according to an illustrative embodiment.
Figure 9:
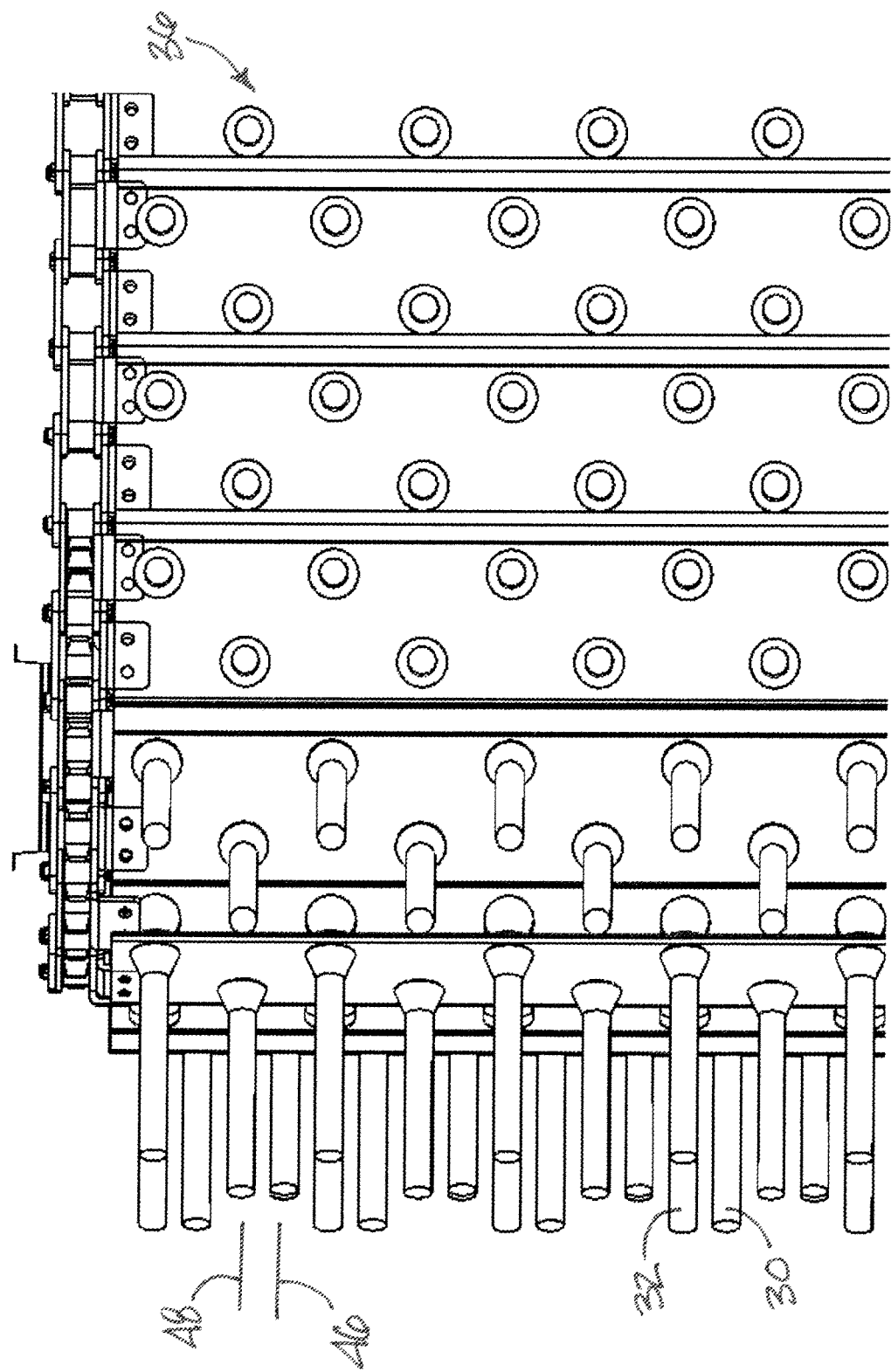
FIG. 9 is a schematic top view of a section of the input end portion of the plant processing system, according to an illustrative embodiment.
Figure 10:
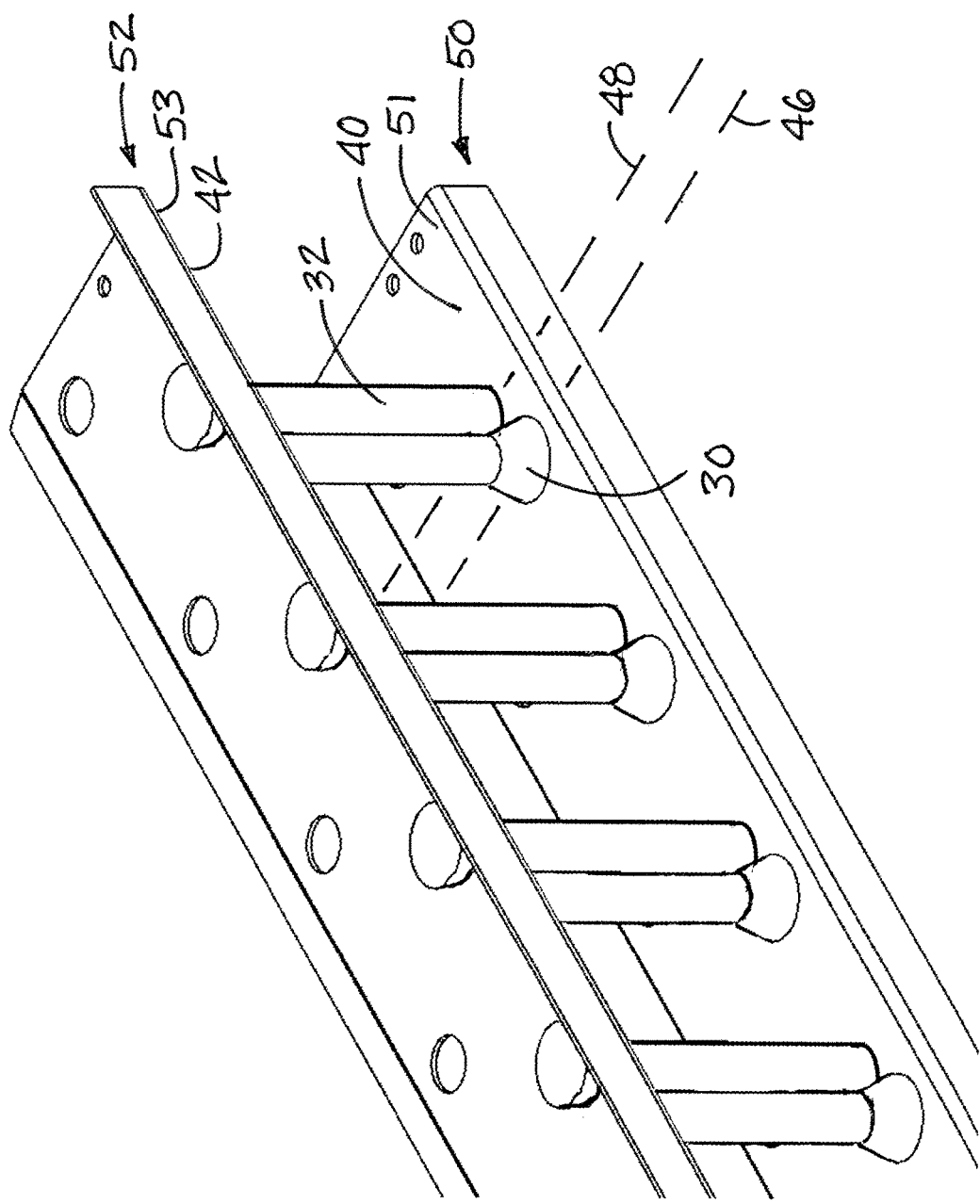
FIG. 10 is a schematic perspective view of isolated elements of the first and second belts showing the relationship of the fingers of the first and second groups of the stripping apparatus, according to an illustrative embodiment.
Figure 11:
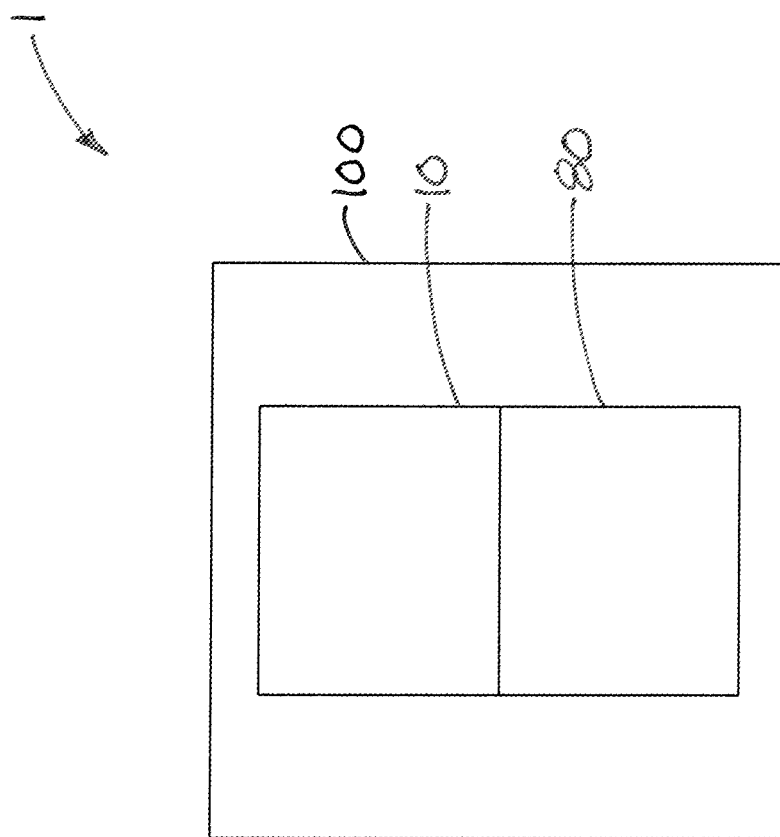
FIG. 11 is a schematic diagram of the system, according to an illustrative embodiment.

With reference now to the drawings, and in particular to FIGS. 1 through 11 thereof, a new plant processing system embodying the principles and concepts of the disclosed subject matter will be described.

The applicants have recognized that harvesting techniques that chop or grind the entirety of the plant into smaller pieces for further processing dilutes the constituent parts of the plant material that have higher levels of the extract or substance sought from the processing, with the constituent parts of the plant material that have lesser or no level of the desired extract. For example, for the extraction of cannabidiol (CBD) from *cannabis* plant material, chopping or grinding the whole plant creates a mixture of the plant buds which have a relatively higher CBD content with the stems and stalks of the plant material which have little if any CBD content. Thus, chopping the plant material into a mixture of the buds and the stems and stalks can greatly reduce the processing efficiency of the plant material for an extract such as CBD because the chopped mixture has a significant content of plant parts which yield little or no CBD.

As a result, the applicants have recognized that processing the plant in a substantially whole form to remove the parts of the plant material having significant levels of the desired extract from the parts of the plant material having insignificant levels of the desired extract is a highly preferable step in the overall processing of the plant material to obtain the extract. Such processing may include disassociating at least some constituent parts of the plant material from other constituent parts of the plant material by, for example, detaching at least some constituent parts of the plant material from other constituent parts. In the case of processing *cannabis* plant material to obtain CBD, this may include detaching the buds of the plant material from the stalks and stems of the plant material. The processing may further include separation of at least some of the constituent parts of the plant material from other constituent parts so that constituent parts with greater concentration or availability of the desired substance may receive further processing, such as grinding or milling, as well as other may techniques to obtain the desired extract. When processing *cannabis* plant material to obtain CBD, this may include separating the buds of the plant material from the stalks and stems of the plant material so that the buds can receive further processing to extract CBD.

In one aspect, the disclosure relates to a plant processing system 1 for processing plant materials. Suitable plant materials may have at least two different types of constituent parts which are attached together through the natural growing process of the plant. The plant materials may comprise a plant in the form or condition in which the plant vegetated prior to being removed from its location of vegetation, such as by severing the plant material from a root structure of the plant, although the plant material suitable for processing by the system may include the root structure. For the purposes of this description, the types of constituent parts of the plant material may be referred to as first plant parts and second plant parts which are attached together in their natural form. Typically, although not necessarily, the type of first plant parts may be more valuable or desirable than the type of second plant parts for extracting a desired substance from the plant material. Usually this difference in value between the constituent parts of the plant material is a result of at least one type of plant part having a relatively higher level of the desired substance and at least one (different) type of plant part having a relatively lower level (or in some cases trace or substantially zero levels) of the desired substance.

In the illustrative description of the disclosure, the plant material comprises a *cannabis* plant, such as of the *cannabis indica* species, and the constituent parts of the plant may include (but are not limited to) the buds and the stems or stalks. For the purpose of this description, the stalk may be considered to be a portion of the plant extending upwardly from the root structure and the stems may be considered to be portions the plant extending from the stalk. Other parts of the *cannabis* plant may also be processed, but may not be of significance to the processing due to not having a relatively high or relatively low content of the desired substance, or may form such a small portion of the whole plant that the processing (or not processing) of those parts is not significant to the efficiency of the process. Also in the illustrative description, at least one of the desired substances sought to be extracted from the plant material is cannabidiol (CBD), which is found in relatively higher levels in the buds of the

*cannabis* plant material and in relatively lower levels, if at all, in the stems and stalks of the *cannabis* plant material. Thus, the buds of the *cannabis* plant may form the first plant parts of the constituent parts of the plant material and the stems and stalks of the *cannabis* plant may form the second plant parts of the constituent parts of the plant material.

The system 1 may include a plant stripping apparatus 10 which is configured to detach constituent parts of the plant material from each other, or otherwise remove the connection between at least some of the constituent parts of the plant material. The plant stripping apparatus 10 may have an input 12 generally configured to receive plant material in a substantially whole condition as the plant vegetated, although some degree of prior processing to the plant may have been performed. The apparatus 10 may also have an output 13 from which constituent parts of the plant material are dispensed from the apparatus 10 in a wholly or partially detached condition from each other. The apparatus 10 may be elongated in a longitudinal direction 14 along a longitudinal axis of the apparatus, and may also have a lateral direction 15 which is generally oriented substantially perpendicular to the longitudinal direction 14. The elongated apparatus 10 may have a first end 16 at which the input 12 may be located, and a second end 17 at which the output 13 may be located.

In greater detail, the plant stripping apparatus 10 may include a frame 20 which may be elongated and extend in the longitudinal direction 14 of the stripping apparatus. The frame may have an inboard end 22 located toward the input 12 and the first end 16, and an outboard end 24 located toward the output 13 and the second end 17, of the apparatus. The frame 20 may be comprised of a first subframe 26 and a second subframe 28, with the second subframe being positioned generally above the first subframe in some embodiments.

The plant stripping apparatus 10 may also include a plurality of stripping fingers 30, 32 which may include at least one group 34 of the stripping fingers which may be movable with respect to the frame 20 along a path of movement for the fingers. In some embodiments, including the illustrative embodiments, the path of movement follows an endless loop and may include at least one linear portion.

In some embodiments, the plurality of stripping fingers 30, 31 may comprise at least two groups of the stripping fingers, which may include a first group 34 of stripping fingers and a second group 36 of stripping fingers. Each group of stripping fingers may have a different path of movement. The groups of fingers may move relative to each other, and the groups of fingers may also move relative to the frame 20, although it is contemplated that some embodiments may have at least one group that does not move with respect to the frame along a path. The stripping fingers of the first group 34 may be oppositely oriented with respect to the fingers of the second group 36, and the fingers of the first and second groups may be oriented substantially parallel to each other. The groups of stripping fingers may move with respect to each other in a first direction which may be oriented substantially parallel to the longitudinal direction 14 of the apparatus, and each group may move relative to the frame in the first direction. In some embodiments, the fingers of the first group 34 may move faster in the first direction relative to the fingers of the second group 36 and relative to the frame 20.

The fingers of the first group 34 may extend from a first working surface 40 and the fingers of the second group 36 may extend from a second working surface 42. The first working surface 40 may be oriented in substantial opposition to the second working surface 42 such that the working surfaces face each other. A gap 44 may be formed between the first 40 and second 42 working surfaces, and the gap may form a pathway for movement of plant materials delimited by the working surfaces between the input 12 and output 13 of the stripping apparatus. The first 40 and second 42 working surfaces may be oriented generally parallel to each other such that a magnitude or width of the gap 44 is generally equal at the input 12 and output 13 of the apparatus 10, although variation in the width of the gap is possible and may be adjusted to enhance the stripping effectiveness of the apparatus 10.

In some embodiments, the stripping fingers may be formed of a material which exhibits a limited degree of resilient bending or flexing capability. Illustratively, the stripping fingers may be formed of a hard or stiff rubber (or other elastomeric) material. Less desirably, the stripping fingers may be formed of a rigid material which substantially prevents flexing or bending of the fingers during usage of the system.

In the illustrative embodiments, the second working surface 42 may be positioned above and over the first working surface 40, and the first and second working surfaces may be in general vertical alignment with each other such that the first working surface faces generally upwardly and the second working surface faces generally downwardly. The fingers of the first group 34 may extend generally upwardly from the first working surface 40 and the fingers of the second group 36 may extend generally downwardly from the second working surface 42. The upwardly extending fingers of the first group 34 and the downwardly extending fingers of the second group 36 may be positioned substantially adjacent to each other. Illustratively, fingers of the first group 34 may be positioned along a first longitudinal line 46 and fingers of the second group 36 may be positioned along a second longitudinal line 48 with each of the longitudinal lines being oriented substantially parallel to the longitudinal direction 14 of the apparatus 10.

In many embodiments, the fingers of the first group 34 may be positioned in a plurality of ranks each extending in the longitudinal direction 14 of the apparatus with the fingers of each rank being arranged along a separate first longitudinal line 46, and the longitudinal lines of the ranks may be laterally spaced from each other at a first lateral spacing and may be oriented substantially parallel to each other. Similarly, the fingers of the second group 36 may be may be positioned in a plurality of ranks each extending in the longitudinal direction 14 of the apparatus with the fingers of each rank being arranged along a separate second longitudinal line 48, and the longitudinal lines of the ranks may be laterally spaced from each other at a second lateral spacing and which are oriented substantially parallel to each other. Movement of the fingers of the first group may generally occur along the first longitudinal line 46 and movement of the fingers of the second group may generally occur along the second longitudinal line 48.

The first longitudinal line 46 may be offset in the lateral direction 15 with respect to the second longitudinal line 48 such that the first lateral spacing and the second lateral spacing are offset from each other, and the fingers of the first group 34 are laterally offset from the fingers of the second group 36. Thus, movement of the fingers of the respective groups along the respective longitudinal lines may occur without any substantial contact or interference between the fingers of the respective groups.

The plant stripping apparatus 10 may further include at least one belt 50 on which at least one of the groups 34, 36 is mounted. The belt 50 may have a first surface 51 which may form a portion of the first working surface 40 from which the first group 34 of fingers extend. In some embodiments, a pair of the belts may be utilized, and may include the first belt 50 and a second belt 52. Similar to the first belt 50 having the first surface 51 forming a portion of the first working surface, the second belt 52 may have a second surface 53 with a portion of the second surface forming the second working surface 42. The second belt 52 may be positioned over the first belt 52. Each of the belts 50, 52 may form an endless loop which may be elongated in shape, with one of the long stretches of the loop corresponding to the working surface provided by the respective belt. Illustratively, each of the belts 50, 52 may be formed of a chain of plates which are pivotally connected together to form the respective endless loops, and at least one stripping finger may be mounted on each of the plates. Each plate may be elongated in the lateral direction of the stripping apparatus 10 such that fingers from two or more ranks of the fingers from one of the groups 34, 36 may be located on the plate.

A pair of pulleys 54, 56 on which at least one of the belts is entrained may be included in the plant stripping apparatus 10. The pulleys 54, 56 may be mounted on the frame 20 at locations that are spaced in the longitudinal direction 14 of the apparatus 10. In greater detail, the pair of pulleys may include a leading pulley 54 which is positioned toward the input 12 of the stripping apparatus and a following pulley 56 which is positioned toward the output 13 of the apparatus 10. In some embodiments, the position of each pulley may be adjustable in a direction that is substantially perpendicular to the longitudinal and lateral directions of the apparatus 10 to permit adjustment of the magnitude of the gap 44 between the first 40 and second 42 working surfaces. Illustratively, each pulley may comprise a rotation shaft which is rotatably mounted on the frame, or respective subframe, and may also include a pair of sprockets which are mounted on the rotation shaft in laterally spaced locations on the shaft to engage the belt entrained on the pulley.

The pair of pulleys 54, 56 may comprise a first pair of pulleys which support the first belt 50, and a second pair of pulleys 58, 60 may support the second belt 52. The first pair of pulleys may be rotatably mounted on the first subframe 26 and the second pair of pulleys may be mounted on the second subframe 28. The positions of the leading 54 and following 56 pulleys of the first pair on the first subframe may be substantially fixed, while some degree of adjustment of the longitudinal spacing of the pulleys 54, 56 may be possible to adjust, for example, the tension applied to the first belt. Similar adjustment to the positions of the leading and following pulleys of the second pair on the second subframe may also be possible.

In some embodiments, the position of the following pulley 60 of the second pair may be movable in a direction toward and away from the following pulley 56 of the first pair, and such adjustment movement may be oriented substantially perpendicular to the first 40 and second 42 working surfaces of the respective belts to effectively adjust the magnitude or width of the gap 44 between the working surfaces. In use, the position of the following pulley 60 may be adjustable in a substantially vertical direction with respect to the position of the following pulley 56.

An adjustment assembly 62 may provide adjustment of the position of the following pulley 60 of the second pair of pulleys with respect to, for example, the following pulley 56 of the first pair of pulleys. The adjustment assembly 62 may be configured to adjust the position of the second subframe 28 with respect to the first subframe 26 to produce the adjustment of the positions of the respective following pulleys. In some embodiments, the adjustment assembly 62 may include an adjustment actuator 64 which is mounted on one of the subframes and engages the other one of the subframes. In the illustrative embodiments, the adjustment actuator is mounted on the first subframe and engages the second subframe, although an opposite arrangement may be utilized. The adjustment actuator 64 may include a rod 66 having a threaded exterior. The threaded rod may be actuated, or rotated, using any suitable structure which may be manually or automatically operated, such as by, for example, a manual crank or knob, or in some embodiments, an automatic actuating motor which is configured to selectively rotate the rod. The adjustment assembly 62 may also include an actuating mount 70 which is mounted on the other one of the subframes from the adjustment actuator, such as the second subframe. The actuating mount may define a threaded passage formed therein for receiving a portion of the rod such that rotation of the threaded rod tends to move the actuating mount toward and away from the first subframe.

In still other embodiments, the following pulley 60 may be biased toward the following pulley 56 in a manner that does not necessarily rigidly hold and maintain the positions of the pulleys, and thus the magnitude of the gap 44. For example, the position of the following pulley 60 may "float" by providing a flexible support of the second subframe 28 toward the outboard end 24 of the frame so that the second subframe is able to raise and lower with respect to the first subframe under the influence of, for example, the plant material moving along the pathway between the working surfaces.

The apparatus 10 may also include a movement assembly 72 for moving at least one of the groups of the stripping fingers with respect to the frame 20, and with respect to the other group of stripping fingers. Illustratively, the movement assembly 72 may include at least one motor 74 which is configured to rotate one of the belts, and a motor may be provided for moving each of the belts 50, 52. A first motor 74 may be configured to rotate the first belt and may be mounted on the first subframe, and a second motor 76 may be configured to rotate the second belt 52 and may be mounted on the second subframe. In the illustrative embodiments, each motor is engaged with the leading pulley of the respective pair of pulleys, although other driving arrangements could be utilized.

Significantly, the motor 74, 76 may be operated such that the respective belts, and thus the respective groups of stripping fingers, move or rotate along the path at different speeds relative to the frame. In some highly preferred implementations, the speed of movement of the second belt along its path is relatively faster than the speed of movement of the first belt along its path. The difference in speed of the belts may produce a shearing effect on the plant material and detachment of the constituent parts of the plant material from each other. For example, in the case of *cannabis* plant material, the buds are detached from the stalks and stems, and the stalks and stems may remain attached to each other but are typically not ground or pulverized into much smaller pieces than the form the stalks and stems had in the whole plant. Operation of the belts of the apparatus at a speed differential may result in the lower first belt (and the stripping fingers thereon) tending to move the plant material along the pathway between the input and output, while the upper second belt (and the stripping fingers thereon) tending to apply a shearing or tearing force to the plant materials carried by the fingers of the lower belt, which may tend to detach the constituent parts of the plant material from each other.

The plant processing system 1 may additionally include a plant parts separating apparatus 80 which receives plant material from the output 13 of the plant stripping apparatus to separate constituent parts of the plant material that have been detached from each other by the stripping apparatus 10. Thus, the separating apparatus 80 may be configured to separate the first plant parts of the plant material from the second plant parts which is useful in a processor apparatus in which, for example, some plant parts will receive further processing while other plant parts will not, or some plant parts will receive processing different from other plant parts. The separating apparatus 80 may thus create at least one stream 82 of the constituent parts of the plant material, and in the illustrative embodiment creates a pair of streams 82, 84 of the constituent parts. Illustratively, a first stream 82 includes the first plant parts of the plant material and a second stream 84 includes the second plant parts of the plant material.

The separating apparatus 80 of the illustrative embodiments may define a plurality of apertures 86 in a surface 88 over which the plant material from the output 13 of the apparatus passes, and the apertures 86 may have sizes and shapes which are configured to allow some plant parts to pass through the apertures while other plant parts are resisted or blocked from passing through the apertures. In the illustrative embodiments, plant parts passing through the apertures form the first stream 82 and plant parts that do not pass through the apertures but continue to pass over the surface 88 of the apparatus 80 form the second stream 84. Illustratively, the separating apparatus 80 may include a grate 90 which defines the plurality of apertures 86 and extends from the output 13 of the plant stripping apparatus 10. The grate 90 may have a first end 92 which is positioned adjacent to the output 13 and a second end 94 which is opposite of the first end 92 such that plant material from the output 13 moves generally from the first end 92 toward the second end of the grate. The grate 90 may also define the surface 88 between the first 92 and second 94 ends.

The plant processing system 1 may also include a mobile base 100 on which elements of the system may be mounted, such as the plant stripping apparatus 10 and the separating apparatus 80. For example, in some implementations the mobile base 100 may comprise a vehicle having harvesting capabilities for severing or otherwise detaching plant material from the ground in which the plant material vegetated, and elements of the system 1 may be incorporated in the vehicle to directly receive the harvested plant material. In other implementations, the mobile base 100 may comprise a towable platform or trailer that may be towed behind a vehicle which may have harvesting capabilities such that the elements of the system 1 are able to receive the plant materials from the vehicle for processing as set forth in this disclosure.

It should be appreciated that in the foregoing description and appended claims, that the terms "substantially" and "approximately," when used to modify another term, mean "for the most part" or "being largely but not wholly or completely that which is specified" by the modified term.

It should also be appreciated from the foregoing description that, except when mutually exclusive, the features of the various embodiments described herein may be combined with features of other embodiments as desired while remaining within the intended scope of the disclosure.

Further, those skilled in the art will appreciate that steps set forth in the description and/or shown in the drawing figures may be altered in a variety of ways. For example, the order of the steps may be rearranged, sub steps may be performed in parallel, shown steps may be omitted, or other steps may be included, etc.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated.

With respect to the above description then, it is to be realized that the optimum dimensional relationships for the parts of the disclosed embodiments and implementations, to include variations in size, materials, shape, form, function and manner of operation, assembly and use, are deemed readily apparent and obvious to one skilled in the art in light of the foregoing disclosure, and all equivalent relationships to those illustrated in the drawings and described in the specification are intended to be encompassed by the present disclosure.

Therefore, the foregoing is considered as illustrative only of the principles of the disclosure. Further, since numerous modifications and changes will readily occur to those skilled in the art, it is not desired to limit the disclosed subject matter to the exact construction and operation shown and described, and accordingly, all suitable modifications and equivalents may be resorted to that fall within the scope of the claims.

We claim:

1. A plant processing system for processing plant material having at least two types of constituent parts attached together, the system comprising:
    a plant stripping apparatus configured to detach the constituent parts of the plant material from each other, the plant stripping apparatus having an input and an output, the plant stripping apparatus being elongated in a longitudinal direction and having a lateral direction oriented substantially perpendicular to the longitudinal direction, the plant stripping apparatus comprising:
        a frame;
        a plurality of stripping fingers comprising at least two groups of the stripping fingers including a first said group of stripping fingers and a second said group of stripping fingers, at least one group of said stripping fingers being movable with respect to the frame along a path of movement, the first group of fingers extending from a first working surface and the second group of fingers extend from a second working surface, the first working surface being oriented in substantial opposition to the second working surface, a gap being formed between the first and second working surfaces, the gap providing a pathway for movement of plant materials between the input and output of the stripping apparatus; and
        at least one belt on which at least one of said groups of stripping fingers is mounted, the at least one belt having a first surface, a portion of the first surface forming the first working surface from which the first group of fingers extends;
        wherein the fingers of the first group of fingers extend along a first longitudinal line and the fingers of the second group of fingers extend along a second longitudinal line, the first longitudinal line being laterally offset with respect to the second longitudinal line such that fingers of the first group of fingers move longitudinally by fingers of the second group of fingers substantially without contact between the fingers of the first and second groups; and wherein the first surface on the at least one belt is continuous between lateral edges of the belt to convey plant material between the input and the output of the plant stripping apparatus.

2. A plant processing system for processing plant material having at least two types of constituent parts attached together, the system comprising a plant stripping apparatus configured to detach the constituent parts of the plant material from each other, the plant stripping apparatus having an input and an output, the plant stripping apparatus being elongated in a longitudinal direction and having a lateral direction oriented substantially perpendicular to the longitudinal direction, the plant stripping apparatus comprising:
a frame;
a plurality of stripping fingers comprising at least two groups of the stripping fingers including a first said group of stripping fingers and a second said group of stripping fingers, at least one group of said stripping fingers being movable with respect to the frame along a path of movement, the first group of fingers extending from a first working surface and the second group of fingers extend from a second working surface, the first working surface being oriented in substantial opposition to the second working surface, a gap being formed between the first and second working surfaces, the gap providing a pathway for movement of plant materials between the input and output of the stripping apparatus; and
at least one belt on which at least one of said groups of stripping fingers is mounted, the at least one belt having a first surface, a portion of the first surface forming the first working surface from which the first group of fingers extends;
wherein the fingers of the first group of fingers extend along a first longitudinal line and the fingers of the second group of fingers extend along a second longitudinal line, the first longitudinal line being laterally offset with respect to the second longitudinal line such that fingers of the first group of fingers move longitudinally by fingers of the second group of fingers substantially without contact between the fingers of the first and second groups; and
a plant part separating apparatus receiving plant material from the output of the plant stripping apparatus and being configured to separate first plant parts of the constituent parts of the plant material from second plant parts of the constituent parts of the plant material.

3. The system of claim 2 wherein the plant part separating apparatus is configured to create a pair of streams of the constituent parts, a first said stream including the first plant parts of the constituent parts of the plant material and a second said stream including the second plant parts of the constituent parts of the plant material.

4. The system of claim 3 wherein the plant part separating apparatus defines a plurality of apertures in a surface over which plant material from the output of the plant stripping apparatus passes, constituent parts of the plant material passing through apertures of the plurality of apertures forming the first stream and constituent parts of the plant material the plant part not passing through apertures of the plurality of apertures forming the second stream.

5. The system of claim 2 wherein the first surface on the at least one belt is continuous between lateral edges of the belt to convey plant material between the input and the output of the plant stripping apparatus.

6. The system of claim 1 wherein the fingers of the first group of fingers and the fingers of the second group of fingers are positioned substantially adjacent to each other.

7. The system of claim 1 wherein the fingers of the first group of fingers extend upwardly and the fingers of the second group of fingers extend downwardly.

8. The system of claim 1 wherein the second working surface is positioned over the first working surface with the first working surface facing upwardly and the second working surface facing downwardly.

9. The system of claim 1 wherein the at least one belt includes a pair of belts with a first belt and a second belt, the second belt having a second surface with a portion of the second surface forming the second working surface.

10. The system of claim 9 wherein each of the belts forms an endless loop elongated in the longitudinal direction of the stripping apparatus.

11. The system of claim 10 wherein the plant stripping apparatus includes a pair of pulleys on which the endless loops of the belts are entrained.

12. The system of claim 9 wherein a magnitude of the gap between the first and second working surfaces is adjustable.

13. The system of claim 12 wherein the frame includes a first subframe carrying the first group of stripping fingers and a second subframe carrying the second group of stripping fingers, a distance between the first and second subframes being adjustable to adjust the magnitude of the gap between the first and second working surfaces.

14. The system of claim 1 wherein the plant stripping apparatus additionally comprises a movement assembly for moving at least one group of the stripping fingers with respect to the frame.

15. The system of claim 1 additionally comprising a mobile base configured to move across a ground surface, and
wherein the plant stripping apparatus is mounted on the mobile base.

16. A plant processing system for processing plant material having at least two types of constituent parts attached together, the system comprising:
a plant stripping apparatus configured to detach the constituent parts of the plant material from each other, the plant stripping apparatus having an input and an output, the plant stripping apparatus being elongated in a longitudinal direction and having a lateral direction oriented substantially perpendicular to the longitudinal direction, the plant stripping apparatus comprising:
a frame;
a plurality of stripping fingers comprising at least two groups of the stripping fingers including a first said group of stripping fingers and a second said group of stripping fingers, at least one group of said stripping fingers being movable with respect to the frame along a path of movement, the first group of fingers extending from a first working surface and the second group of fingers extend from a second working surface, the first working surface being oriented in substantial opposition to the second working surface, a gap being formed between the first and second working surfaces, the gap providing a pathway for movement of plant materials between the input and output of the stripping apparatus, the fingers of the first group of fingers and the fingers of the second group of fingers are positioned substantially adjacent to each other, the fingers of the first group of fingers extending along a first longitudinal line and the fingers of the second group of fingers extending along a second longitudinal line, the first longitudinal line being laterally offset with respect to the second longitudinal line such that fingers of the first group of fingers move longitudinally by fingers of the second group of fingers substantially without contact between the fingers of the first and second groups, the fingers of the first group of fingers extending upwardly and the fingers of the second group of fingers extending downwardly; and a pair of belts with a first belt and a second belt, the first belt having a first surface with a portion of the first surface forming the first working surface, the second belt having a second surface with a portion of the second surface forming the second working surface, the first group of stripping fingers being mounted on the first belt and the second group of stripping fingers being mounted on the second belt;

a plant part separating apparatus receiving plant material from the output of the plant stripping apparatus and being configured to separate first plant parts of the constituent parts of the plant material from second plant parts of the constituent parts of the plant material, the plant part separating apparatus being configured to create a pair of streams of the constituent parts, a first said stream including the first plant parts of the constituent parts of the plant material and a second said stream including the second plant parts of the constituent parts of the plant material.

17. The system of claim 16 wherein the second working surface is positioned over the first working surface with the first working surface facing upwardly and the second working surface facing downwardly.

18. The system of claim 16 wherein a magnitude of the gap between the first and second working surfaces is adjustable.

19. The system of claim 16 additionally comprising a mobile base configured to move across a ground surface, and wherein the plant stripping apparatus and the plant part separating apparatus are mounted on the mobile base.

20. A plant processing system for processing plant material having at least two types of constituent parts attached together, the system comprising:
a plant stripping apparatus configured to detach the constituent parts of the plant material from each other, the plant stripping apparatus having an input and an output, the plant stripping apparatus being elongated in a longitudinal direction and having a lateral direction oriented substantially perpendicular to the longitudinal direction, the plant stripping apparatus comprising:
a frame;
a plurality of stripping fingers comprising at least two groups of the stripping fingers including a first said group of stripping fingers and a second said group of stripping fingers, at least one group of said stripping fingers being movable with respect to the frame along a path of movement, the first group of fingers extending from a first working surface and the second group of fingers extend from a second working surface, the first working surface being oriented in substantial opposition to the second working surface, a gap being formed between the first and second working surfaces, the gap providing a pathway for movement of plant materials between the input and output of the stripping apparatus; and
at least one belt on which at least one of said groups of stripping fingers is mounted, the at least one belt having a first surface, a portion of the first surface forming the first working surface from which the first group of fingers extends;

a plant part separating apparatus receiving plant material from the output of the plant stripping apparatus and being configured to separate first plant parts of the constituent parts of the plant material from second plant parts of the constituent parts of the plant material;

wherein the plant part separating apparatus is configured to create a pair of streams of the constituent parts, a first said stream including the first plant parts of the constituent parts of the plant material and a second said stream including the second plant parts of the constituent parts of the plant material; and wherein the plant part separating apparatus defines a plurality of apertures in a surface over which plant material from the output of the plant stripping apparatus passes, constituent parts of the plant material passing through apertures of the plurality of apertures forming the first stream and constituent parts of the plant material the plant part not passing through apertures of the plurality of apertures forming the second stream.

21. The system of claim 2 wherein a magnitude of the gap between the first and second working surfaces is adjustable.

22. The system of claim 16 wherein a magnitude of the gap between the first and second working surfaces is adjustable.

23. The system of claim 20 wherein a magnitude of the gap between the first and second working surfaces is adjustable.

24. The system of claim 2 additionally comprising a mobile base configured to move across a ground surface, and wherein the plant stripping apparatus is mounted on the mobile base.

25. The system of claim 16 additionally comprising a mobile base configured to move across a ground surface, and wherein the plant stripping apparatus is mounted on the mobile base.

26. The system of claim 20 additionally comprising a mobile base configured to move across a ground surface, and wherein the plant stripping apparatus is mounted on the mobile base.

* * * * *